(12) United States Patent
Abe et al.

(10) Patent No.: US 6,439,052 B1
(45) Date of Patent: Aug. 27, 2002

(54) GYROSCOPE AND INPUT APPARATUS USING THE GYROSCOPE THAT DETECTS DISPLACEMENT OF LEG OF TUNING FORK BY MEANS OF CAPACITANCE CHANGE WHEN ANGULAR VELOCITY IS ENTERED

(75) Inventors: Munemitsu Abe; Masayoshi Esashi, both of Miyagi-ken; Shinji Murata, Iwate-ken, all of (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/565,003

(22) Filed: May 4, 2000

(30) Foreign Application Priority Data

May 7, 1999 (JP) ............................................ 11-127803
May 7, 1999 (JP) ............................................ 11-127804

(51) Int. Cl.[7] ................................................ G01P 9/04
(52) U.S. Cl. ..................................... 73/504.16; 73/370
(58) Field of Search ........................ 73/504.16, 504.15, 73/504.12, 504.04, 514.32; 310/370, 321

(56) References Cited

U.S. PATENT DOCUMENTS

| | | | | |
|---|---|---|---|---|
| 4,381,672 A | | 5/1983 | O'Connor et al. ............ 73/505 |
| 4,421,621 A | * | 12/1983 | Fujii et al. .................. 310/361 |
| 4,628,734 A | | 12/1986 | Watson ........................ 73/505 |
| 5,335,544 A | * | 8/1994 | Wagner et al. ........... 73/514.32 |
| 5,451,828 A | | 9/1995 | Tomikawa et al. .......... 310/370 |
| 6,257,058 B1 | * | 7/2001 | Murata ..................... 73/504.16 |

* cited by examiner

Primary Examiner—Helen Kwok
(74) Attorney, Agent, or Firm—Brinks Hofer Gilson & Lione

(57) ABSTRACT

The invention provides a gyroscope that brings about the miniaturization of a device, improvement of detection sensitivity, and reduction of driving voltage. A gyroscope of the present invention is provided with a tuning fork formed of conductive material having a plurality of legs and a support, a top glass substrate and a bottom glass substrate for holding the tuning fork in-between, a plurality of driving electrodes for driving the plurality of legs in capacitance coupling with the legs, and a plurality of detecting electrodes, each detecting electrode is disposed so as to face to the end face of each leg in the extending direction correspondingly to each leg.

22 Claims, 12 Drawing Sheets

GYROSCOPE AND INPUT APPARATUS USING THE GYROSCOPE THAT DETECTS DISPLACEMENT OF LEG OF TUNING FORK BY MEANS OF CAPACITANCE CHANGE WHEN ANGULAR VELOCITY IS ENTERED

BACKGROUND OF THE INVENTION

1. Field of the Invention

This invention relates to a gyroscope and an input apparatus having the gyroscope, more particularly relates to a gyroscope that detects the displacement of a leg of a tuning fork caused particularly when the angular velocity is supplied in the form of change in capacitance and an input apparatus having the gyroscope.

2. Description of the Related Art

Heretofore, the gyroscope having a tuning fork formed of conductive material such as silicon has been known. The gyroscope of this type detects the vibration in the direction perpendicular to the vibration direction caused by Coriolis force when a leg of a tuning fork is vibrated in one direction and the angular velocity with the center axis in the longitudinal direction of the leg is supplied during vibration. Because the magnitude of the vibration caused by the Coriolis force corresponds to the magnitude of the angular velocity, the gyroscope can be used as an angular velocity sensor, it can be applied to, for example, the coordinate input apparatus of a personal computer.

FIG. 19 is a diagram for illustrating the structure of a tuning fork that is the main component of the conventional gyroscope. As shown in FIG. 19, the tuning fork 100 of this example has three legs 101 and a support 102 which connects the three legs to base ends of each leg 101 and is formed of silicon that has been rendered conductive. The tuning fork 100 is fixed to a substrate 103 with the support 102, and driving electrodes (not shown in the drawing) are provided under the corresponding legs 101 respectively. As the result, the electrostatic attractive force caused when a voltage is applied to a driving electrode causes vibration of each leg 101 in the vertical direction.

In this gyroscope, the angular velocity having the rotation axis in the longitudinal direction of the leg 101 supplied to the leg during vibration in the vertical direction causes the vibration in the horizontal direction, the vibration in the horizontal direction is detected by means of a pair of detecting electrodes 104 disposed on both sides of each leg 101. In detail, when the gap between the detecting electrode disposed on one side of a leg 101 and the leg 101 is narrowed and a gap between a detecting electrode 104 disposed on the other side of the leg 101 and the leg 101 is widened concomitantly with horizontal displacement of the leg 101, two pairs of electrostatic capacitance formed by the detecting electrodes 104 and legs 101 are changed. The magnitude of input angular velocity is detectable based on the electrostatic capacitance change.

In the case of the gyroscope having the structure described herein above, the gap between a leg 101 and an adjacent leg 101 (referred to as inter-leg gap hereinafter) cannot be narrowed unlimitedly because detecting electrodes are provided on both sides of each leg 101. The inter-leg gap is $G=2x_1+3x_2$ wherein the width of a detecting electrode 104 is denoted by $x_1$ and the gap between a detecting electrode 104 and a leg 101 and the gap between detecting electrodes adjacent each other are denoted by $x_2$. Because of work limit of $x_1$ and $x_2$ in silicon work to which general semiconductor device fabrication technique is applied, the narrow inter-leg gap G has been limited.

On the other hand, it has been found that the reduction of the inter-leg gap G of a three-leg tuning fork leads to the increased "Q value" that is the performance index for representing the magnitude of resonance of a device of this type. The increased Q value contributes not only to improvement of detection sensitivity of angular velocity but also to improvement of conversion efficiency from the electric energy supplied to a device to the vibration energy, and as the result the driving voltage can be reduced.

However, though it is estimated that the reduced inter-leg gap is advantageous in miniaturization of a device, improvement of detection sensitivity, and reduction of driving voltage, because of the limitation on the reduction of the inter-leg gap of the conventional gyroscope, the increased Q value has not been realized.

SUMMARY OF THE INVENTION

The present invention has been accomplished to solve the above-mentioned problem, and it is the object of the present invention to provide a high-quality and low-cost gyroscope that is variously advantageous as described herein above and an input apparatus that uses the gyroscope.

To achieve the above-mentioned object, a gyroscope of the present invention is characterized by comprising a tuning fork formed of conductive material having vibrators and a support for connecting the base ends of the vibrators, driving electrodes for driving the vibrators in capacitance coupling with the vibrators, and at least one detecting electrode for each vibrator disposed correspondingly to the vibrator so as to face at least partially to the end face of the vibrator in the extending direction for detecting the capacitance formed between the detecting electrode and the end face.

The gyroscope of the present invention operates based on the detection principle that the vibration of a vibrator (corresponding to the above-mentioned "leg") of a tuning fork is detected in the form of capacitance change like the conventional gyroscope. Usually, the capacitance C is represented as shown in the following.

$$C=\epsilon \cdot (S/d) \quad (1)$$

wherein $\epsilon$ denotes a dielectric constant, S denotes the surface of an electrode, and d denotes the gap between electrodes.

In the case of a conventional gyroscope, the change of the gap between a leg and a detecting electrode concomitant with vibration, namely capacitance change due to the change of the gap between electrodes d in the above-mentioned equation (1), is detected. On the other hand, in the case of a gyroscope of the present invention, the change of the facing area of a leg to a detecting electrode concomitant with vibration, namely capacitance change due to the change of the electrode area S in the above-mentioned equation (1) is detected. The detection in the conventional gyroscope is different from the detection in the gyroscope of the present invention in that point.

In other words, the gyroscope of the present invention is structurally featured in that a detecting electrode at least partially facing to the end face of a vibrator in the extending direction to form a capacitance between the detecting electrode and the end face of the vibrator is provided. Because of the structure, the vibrators of the tuning fork are vibrated when a voltage is applied to the driving electrode, and when the angular velocity having the rotation axis in the longitudinal direction of the vibrator is supplied in that state, vibration in the direction perpendicular to the above-mentioned vibration direction is caused. At that time, because the end face of the vibrator is facing to the detecting electrode, and the facing area of the end face to the detecting electrode changes concomitantly with vibration of the vibrator, the capacitance change is caused. The angular velocity can be detected by detecting the capacitance change.

Therefore, in the case of the gyroscope of the present invention, the detecting electrode may be provided on the extension line in the longitudinal direction of the vibrator, and it is not necessary to provide the detecting electrode between a leg and an adjacent leg unlike the conventional gyroscope. As the result, the inter-leg gap can be minimized to the work limit of the material of the tuning fork, for example, work limit of silicon, and Q value is thereby increased, the detection sensitivity is improved, and the driving voltage is reduced. Of course, the device is miniaturized.

At least one detecting electrode may be provided for each vibrator. In other words, in the case that one detecting electrode is provided, the capacitance change of one capacitor involving one detecting electrode and one vibrator may be detected. In the case that two detecting electrodes are provided, for example in the structure that the vibrator is driven in the vertical direction, two detecting electrodes may be arranged horizontally so as to face to one end face of one vibrator. In this case, two capacitors are formed from two detecting electrodes and one vibrator, and when the vibrator is vibrated in the horizontal direction, the capacitance of one capacitor increases some magnitude then concomitantly the capacitance of the other capacitor decreases the same magnitude. Therefore, by detecting the difference between two capacitance changes, doubled capacitance change is obtained from the same vibration, and the detection sensitivity is improved preferably.

The driving electrode may be formed extendedly in the extending direction of each vibrator, and may be disposed at least on one side face of the tuning fork and at the position corresponding to each vibrator. In this case, each vibrator is vibrated in the vertical direction with respect to the tuning fork and the vibration due to resonance is horizontal. The gyroscope of the present invention is by no means limited to the case in which the vibrator is driven in the vertical direction and the horizontal vibration is detected, and the gyroscope of the present invention can be applied to the case in which the vibrator is driven in the horizontal direction and the vertical vibration is detected.

The input apparatus of the present invention is characterized in that the above-mentioned gyroscope of the present invention is used. By using the gyroscope of the present invention, the small-sized apparatus such as a coordinate input apparatus of a personal computer is realized.

Another gyroscope of the present invention is characterized by comprising a tuning fork having vibrators formed of conductive material and a support for connecting the base end sides of the vibrators, driving electrodes for driving the vibrators in capacitance coupling with the vibrators each other, and detecting electrodes provided at least above or under one side face of the tuning fork so as to face to the ends of the vibrators for detecting the capacitance formed between at least one detecting electrode and the vibrator that are facing each other.

The above-mentioned another gyroscope of the present invention operates based on the detection principle that the change of the facing area of a leg to a detecting electrode concomitant with vibration, namely capacitance change due to the change of the electrode area S in the above-mentioned equation (1) is detected. In the case of a conventional gyroscope, the change of the gap between a leg and a detecting electrode concomitant with vibration is detected. The detection in the conventional gyroscope is different from the detection in the above-mentioned another gyroscope of the present invention in that point.

In other words, the above-mentioned another gyroscope of the present invention is structurally featured in that at least one detection electrode for detecting the capacitance formed between this detection electrode and the vibrator is disposed at least above or under one side face of the tuning fork so as to face to the end of the vibrator. Because of the structure, the vibrators of the tuning fork are vibrated when a voltage is applied to the driving electrode, and when the angular velocity having the rotation axis in the longitudinal direction of the vibrator is supplied in that state, vibration in the direction perpendicular to the above-mentioned vibration direction is caused. At that time, because the end face of the vibrator is facing to the detecting electrode, and the facing area of the end face to the detecting electrode changes concomitantly with vibration of the vibrator, the capacitance change is caused. The angular velocity can be detected by detecting the capacitance change.

Therefore, in the case of the above-mentioned another gyroscope of the present invention, the detecting electrode may be provided above or under one side face of the vibrator, for example on the substrate in the case that the vibrator is supported on an arbitrary substrate, so as to face to the vibrator, and it is not necessary to provide the detecting electrode between a leg and an adjacent leg unlike the conventional gyroscope. As the result, the inter-leg gap can be minimized to the work limit of the material of the tuning fork, for example, work limit of silicon, and Q value is thereby increased, the detection sensitivity is improved, and the driving voltage is reduced. Of course, the device is miniaturized.

It is desirable that the driving electrode is formed extendedly in the extending direction of each vibrator and disposed at least above or under one side face of the tuning fork at the position that faces to each vibrator, and the detecting electrodes are disposed apart from the driving electrode to prevent the parasitic capacitance between the driving electrode and the detecting electrode. If the parasitic capacitance is generated between the driving electrode and the detecting electrode, when the angular velocity is detected to detect the capacitance change generated between the vibrator and the detecting electrode, the parasitic capacitance is also detected undesirably to cause noise component, and SN ratio is decreased disadvantageously. If the driving electrode and the detecting electrode are disposed separately each other with a sufficient space, such disadvantage is prevented.

At least one detecting electrode may be provided for each vibrator, otherwise a pair of electrodes that faces to each vibrator may be used as each detecting electrode and the pair of electrodes may detect two capacitances formed between the respective electrodes of the pair and the end of each vibrator. In detail, in the case that one detecting electrode is used, the capacitance change of one capacitor formed by one detecting electrode and one vibrator may be detected. In the case that the detecting electrode is disposed correspondingly to the end of each vibrator, because the displacement of each vibrator is the maximum at the end, the maximum capacitance change is detected. On the other hand, in the case that one pair of two detecting electrodes are provided, two capacitances are formed by two detecting electrode and one vibrator, and when the vibrator is vibrated in one direction, the capacitance of one capacitor increases and the capacitance of the other capacitor decreases by the same magnitude concomitantly. Therefore, in the case of this structure, detection of the difference between two capacitance changes brings about doubled capacitance change for the same vibration, and the detection sensitivity is improved preferably. The total capacitance value is preferably 0.1 pF or larger.

Another input apparatus of the present invention is characterized in that the above-mentioned another gyroscope of the present invention is used. By using the above-mentioned another gyroscope of the present invention, the small-sized apparatus such as a coordinate input apparatus of a personal computer is realized.

DETAILED DESCRIPTION OF THE PREFERRED EMBODIMENTS

[First Embodiment]

The first embodiment of the present invention will be described in detail hereinafter with reference to FIG. 1 to FIGS. 4A to 4D.

Figure 1:
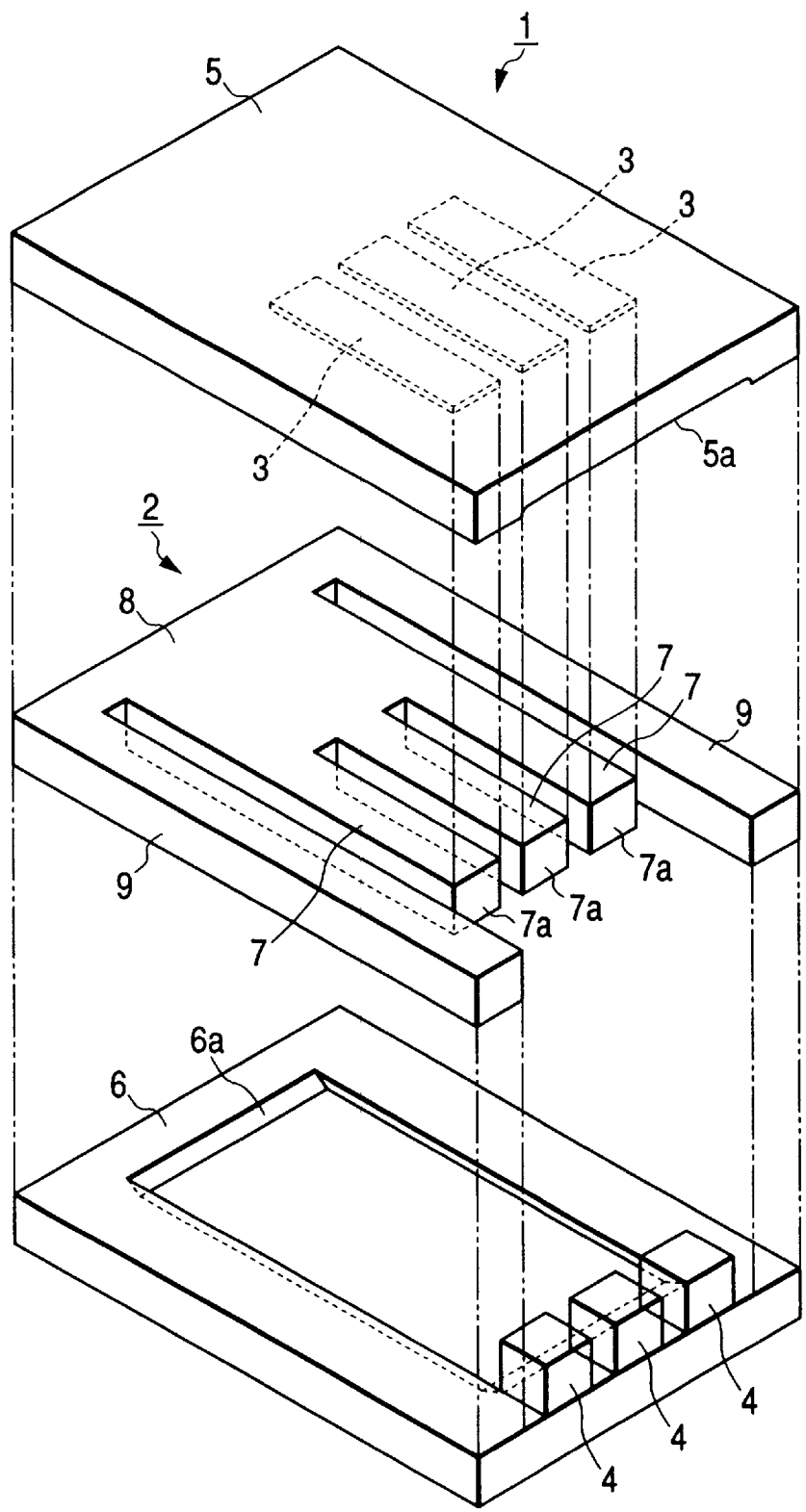
FIG. 1 is an exploded perspective view for illustrating a gyroscope of the first embodiment of the present invention.
Figure 2:
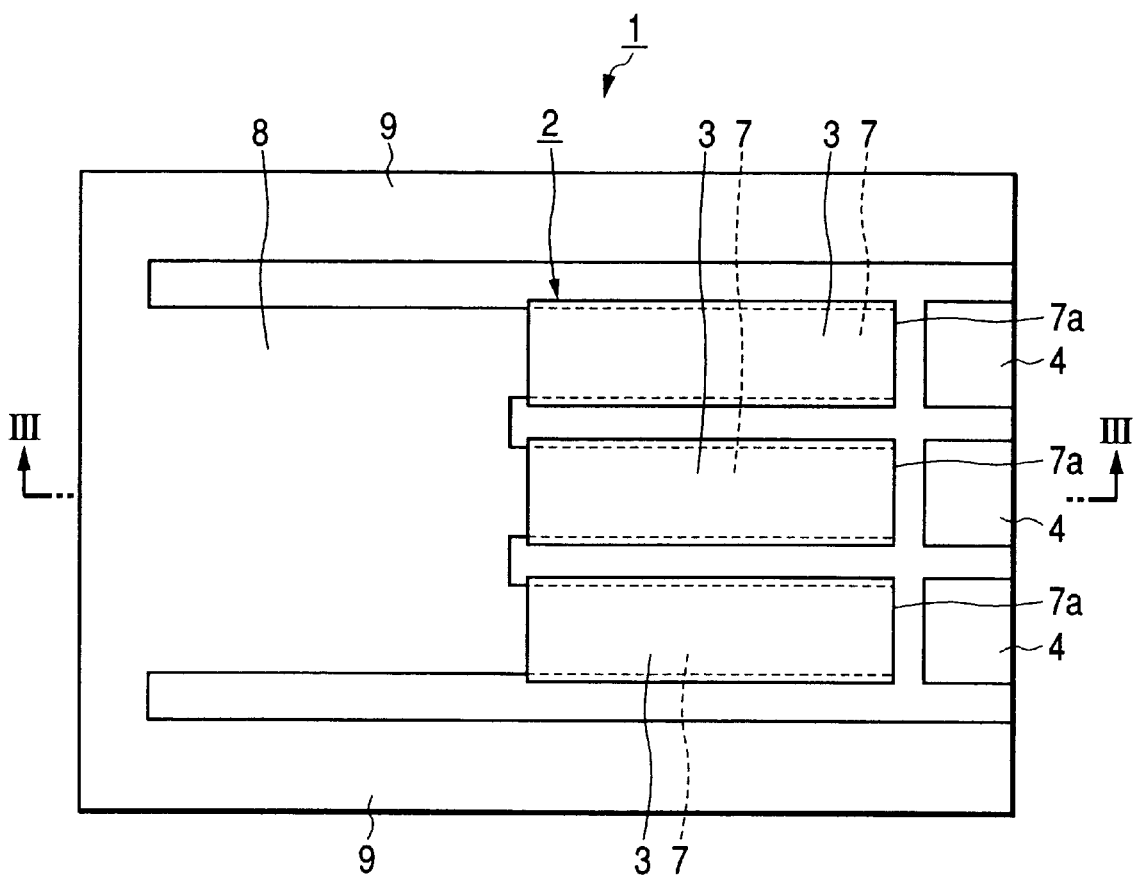
FIG. 2 is a plan view for illustrating the gyroscope of the first embodiment of the present invention.
Figure 3:
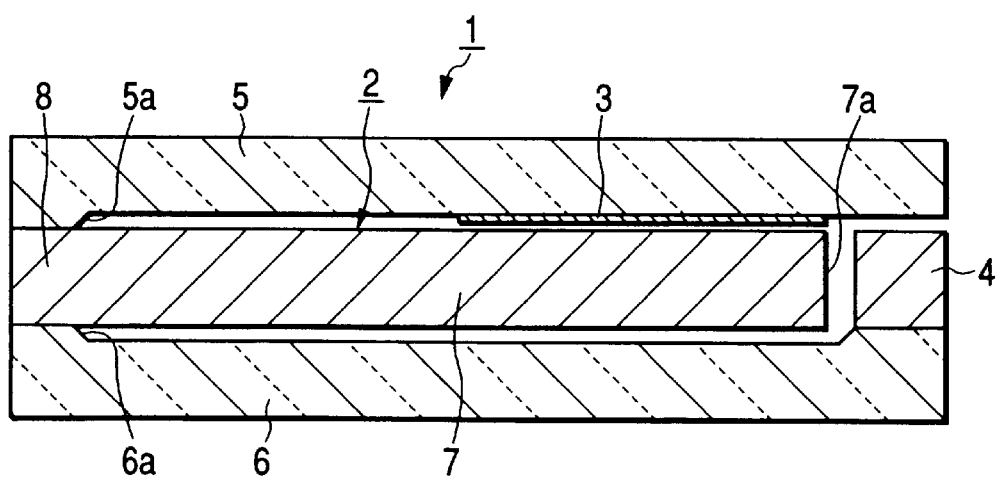
FIG. 3 is a side cross sectional view along the line III—III of FIG. 2.

FIG. 1 is an exploded perspective view for illustrating a gyroscope of the present embodiment, FIG. 2 is a plan view, FIG. 3 is a side cross sectional view, and FIGS. 4A to 4D are process cross sectional views for illustrating the fabrication process of a gyroscope 1. In these drawings, character 2 denotes a tuning fork, 3 denotes a driving electrode, 4 denotes a detecting electrode, 5 denotes a top glass substrate, and 6 denotes a bottom glass substrate.

In the gyroscope 1 of the present embodiment, a tuning fork 2 having three legs 7 (vibrator) and a support 8 that connects the ends of these three legs 7 is used. Each detecting electrode 4 is disposed so as to face to the end face 7a of each extending leg 7. The area of the faces of the leg 7 and detecting electrodes 4 that are facing each other is approximately equal. The tuning fork 2 has surrounding frames 9, and the tuning fork 2, detecting electrodes 4, and frame 9 are formed from one silicon substrate having a thickness of approximately 200 $\mu$m. As shown in FIG. 1 and FIG. 3, the frame 9 is placed fixedly between the top glass substrate 5 and the bottom glass plate 6, pits 5a and 6a having a depth of approximately 10 $\mu$m are formed on areas on the inside surface of two glass substrates 5 and 6 located above and under the tuning fork 2 respectively, gaps having a thickness of approximately 10 $\mu$m are formed between the glass substrates 5 and 6 and the tuning fork 2, and the legs 7 of the tuning fork 2 can vibrate without restriction. The detecting electrodes 4 are fixed to the bottom glass substrate 6.

As shown in FIG. 1 and FIG. 2, one driving electrode 3 is provided corresponding to each leg 7, and formed of an aluminum film or chromium film having a thickness of approximately 300 nm formed on the bottom side of the top glass substrate 5 as shown in FIG. 3. The driving electrodes 3 and detecting electrodes 4 have terminals (not shown in the drawing) served for applying or receiving a voltage.

Equal potential patterns formed of the same aluminum or chromium film as the driving electrode 3 is provided on the area of the inside surfaces of the top and bottom glass substrates 5 and 6 where the driving electrode 3 is not provided though not shown in the drawing because the equal potential pattern is not necessary for performing the gyroscope function but necessary for fabrication of the gyroscope.

Next, an exemplary fabrication process of the gyroscope 1 having the above-mentioned structure is described.

Figure 4A:
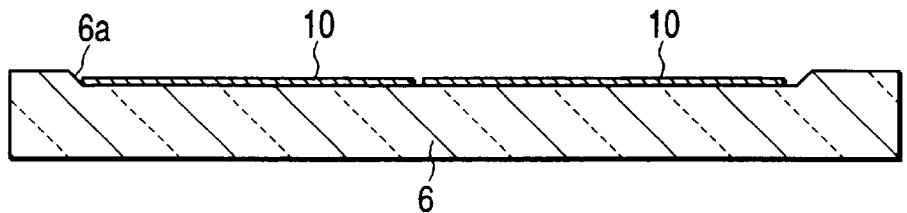
FIGS. 4A to 4D are process cross sectional views for describing the fabrication process of the gyroscope of the first embodiment of the present invention.

As shown in FIG. 4A, on a glass substrate 6, a chromium film is spattered on the surface, a resist pattern is formed, and the chromium film is etched with aid of the resist pattern as a mask. Next, the surface of the glass substrate 6 is subjected to hydrofluoric acid etching with aid of the resist pattern and chromium film as the mask to form a pit 6a having a depth of approximately 10 $\mu$m on the area corresponding to the tuning fork 2 on the glass substrate 6. Then, the resist pattern and chromium pattern are removed. Next, an aluminum film or chromium film having a thickness of approximately 300 nm is formed on the entire surface by spattering, and patterned by means of known photolithography technique to form an equal potential pattern 10, and the processed glass substrate is used as the bottom glass substrate 6. A top glass substrate 5 is fabricated in the same manner as used herein above. In the case of a top glass substrate 5, an equal potential pattern and driving electrodes 3 are formed simultaneously by forming an aluminum film or chromium film having a film thickness of approximately 300 nm.

Figure 4B:
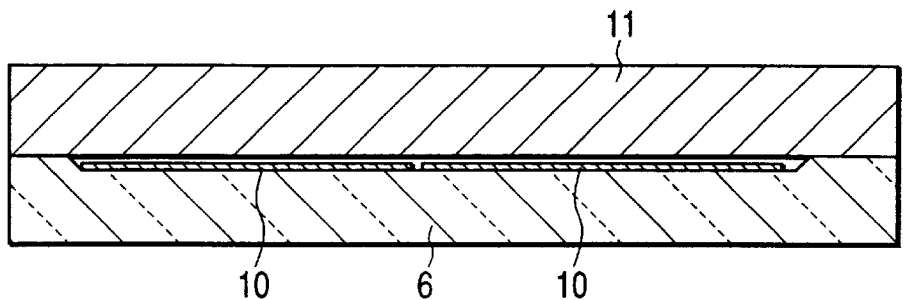

As shown in FIG. 4B, the bottom side of a silicon substrate 11 is bonded to the bottom glass substrate by means of anodic bonding. At that time, the area to be the support 8 and the area to be the detecting electrode 4 of the silicon substrate 11 are bonded. In anodic bonding process, a positive voltage is applied to the silicon substrate 11 and a negative voltage is applied to the bottom glass substrate 6 to bond the silicon and glass together. The silicon substrate can be bent and brought into touch to the glass substrate 6 due to electrostatic force caused during anodic bonding process because the gap between the silicon substrate 11 surface and the glass substrate 6 surface is only approximately 10 μm on the area where the tuning fork 2 is to be formed. If both surfaces are brought into touch each other, the touched area is bonded, and the tuning fork can not be fabricated. If the potential of the glass substrate 6 and the silicon substrate 11 is equalized, such undesirable bonding of the area of the silicon substrate 6, that is not to be bonded to the glass substrate 6, is prevented. The equal potential pattern 10 is used on the glass substrate 6 surface on that reason.

Figure 4C:
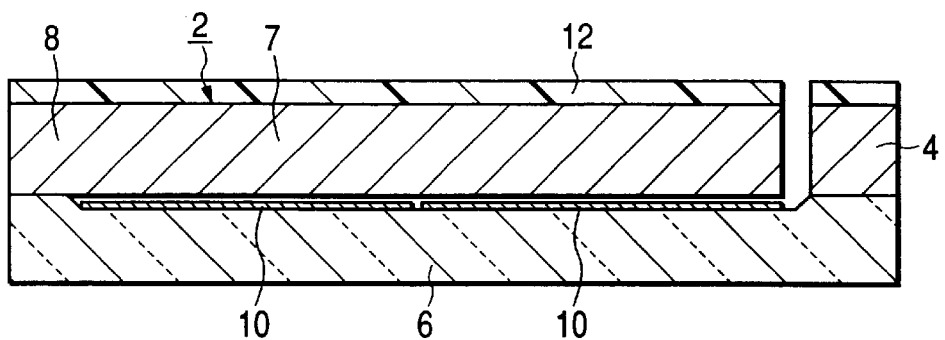

Next, as shown in FIG. 4C, a resist pattern 12 is formed on the silicon substrate 11 surface. At that time, the plane resist pattern 12 is shaped so as not to remove silicon on the portion corresponding to the tuning fork 2, frame 9, and detecting electrodes 4. The silicon substrate 11 is subjected to etching though the thickness of the silicon substrate 11 by means of anisotropic etching such as reactive ion etching with aid of the resist pattern 12 as a mask. Thereby, the tuning fork 2, frame 9, and detecting electrodes 4 are formed, and the legs 7 of the tuning fork 2 remain untouched above the bottom glass substrate 6. Thereafter, the resist pattern 12 is removed.

Figure 4D:
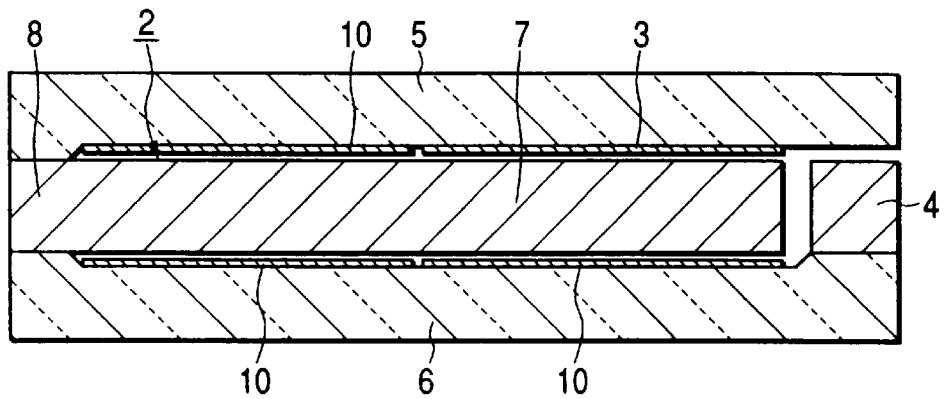

Next, as shown in FIG. 4D, the top side of the silicon substrate 11 is bonded to the top glass substrate 5 that has been fabricated separately by means of anodic bonding. At that time, the frame 9 and support 8 of the silicon substrate 11 are bonded to the top glass substrate 5. Through the above-mentioned processes, the gyroscope 1 of the present embodiment is completed.

When the gyroscope 1 of the present embodiment is used, an oscillator is connected to the driving electrodes 3, a capacitance detector is connected to the detecting electrodes 4, and the tuning fork 2 is grounded. When a voltage having a frequency of several kHz is applied to the driving electrodes 3 by driving the oscillator, the legs 7 of the tuning fork 2 are vibrated in the vertical direction. In this state, when the angular velocity having the rotation axis in the longitudinal direction of the leg 7 is supplied, the horizontal vibration is caused corresponding to the magnitude of the supplied angular velocity. At that time, the end faces 7a of each leg 7 of the tuning fork 2 are faced to the detecting electrodes 4, the facing area where each end face 7a faces to each detecting electrode 4 changes concomitantly with vibration of the leg 7, and the facing area change causes the capacitance change. The angular velocity can be detected by detecting the capacitance change by means of a capacitance detector.

It is not required to provide a detecting electrode between a leg and an adjacent leg in the gyroscope 1 of the present embodiment unlike the conventional gyroscope. As the result, the inter-leg gap can be minimized to the work limit, for example, approximately 10 μm, and Q value can be increased. For example, in a gyroscope having an inter-leg gap of 200 μm, though Q value is approximately 1000 for the inter-leg gap of 300 μm to 400 μm, Q value is doubled to approximately 2000 for narrower inter-leg gap of several tens μm. The increased Q value brings about the improved detection sensitivity and the reduced driving voltage when the device is used as an angular sensor. Furthermore, the device can be miniaturized. The device has the structure that can be vacuum-sealed, and Q value is improved the more.

Because the tuning fork 2 is placed between two glass substrates 5 and 6 in the gyroscope 1 of the present embodiment, the tuning fork 2 is protected by the glass substrates 5 and 6, and the gyroscope is easy to be handled. Because dust is difficult to enter into the tuning fork 2 structure, disturbance is suppressed, and the sensor accuracy is improved. The gyroscope 1 has the structure that is acceptable of vacuum sealing, and the vacuum seal brings about high Q value the more.

The process in which a tuning fork and detecting electrode are fabricated separately and then these components are fixed on a substrate requires a lot of work and a long time for positioning these components in the fabrication work. On the other hand, because the tuning fork 2 and detecting electrodes 4 are formed so as to be separated by means of etching from a single silicon substrate 11, positioning work is not required, and the gyroscope with high work accuracy can be fabricated.

[Second Embodiment]

Figure 5:
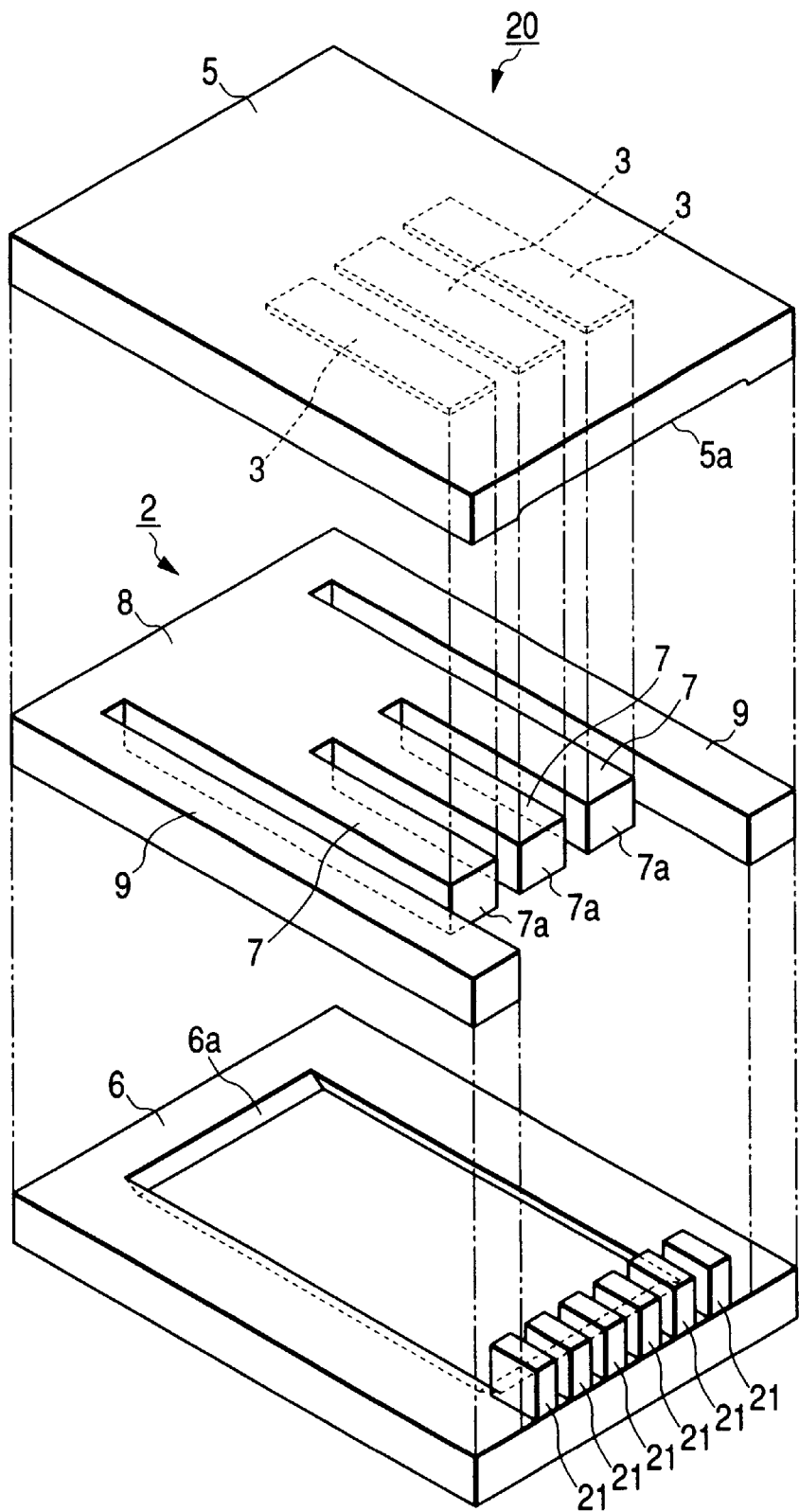
FIG. 5 is an exploded perspective view for illustrating a gyroscope of the second embodiment of the present invention.

The second embodiment of the present invention will be described in detail with reference to FIG. 5 to FIG. 7. FIG. 5 is an exploded perspective view of a gyroscope 20 of the present embodiment, FIG. 6 is a plan view, and FIG. 7 is a side cross sectional view.

The gyroscope 20 of the present embodiment is different from the gyroscope 1 of the first embodiment only in the structure of the detecting electrode. The same components that are common to FIG. 1 to FIG. 3 for the first embodiment and to FIG. 5 to FIG. 7 in the present embodiment are given the same characters, and the detailed description is omitted.

Figure 6:
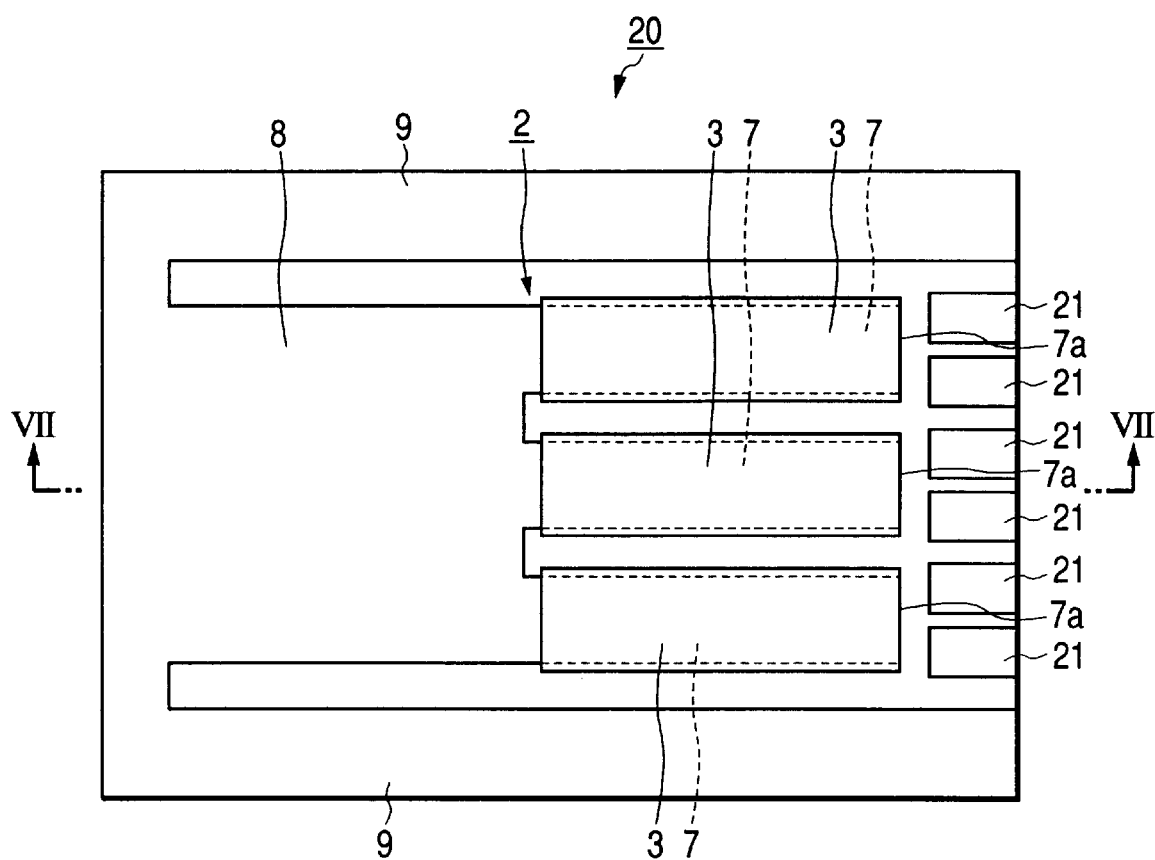
FIG. 6 is a plan view for illustrating the gyroscope of the second embodiment of the present invention.
Figure 7:
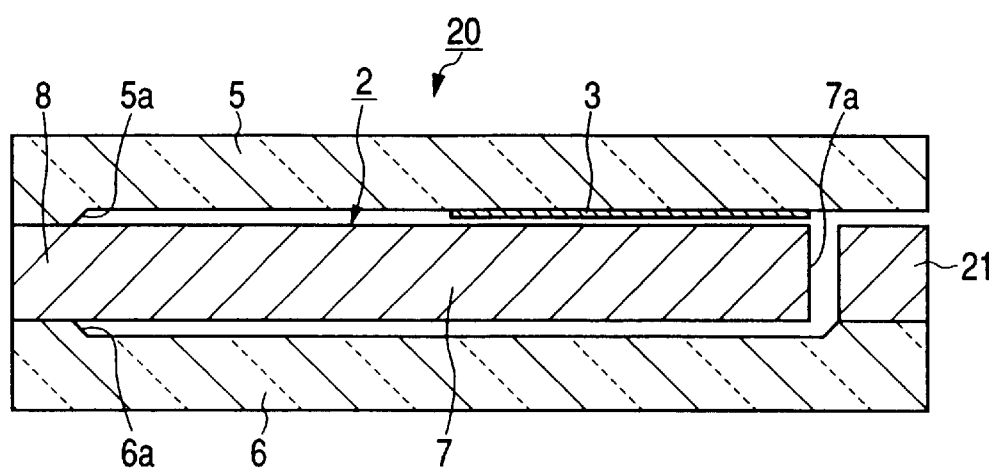
FIG. 7 is a side cross sectional view along the line VII—VII of FIG. 6.

A tuning fork 2 having three legs 7 (vibrators) and a support 8 for connecting the ends of these legs is used as shown in FIG. 5 and FIG. 6 for the gyroscope 20 of the present embodiment like the gyroscope 1 of the first embodiment. In the case of the first embodiment, one detecting electrode 4 is provided for each end face 7a of each leg 7, on the other hand, in the case of the present embodiment, two detecting electrodes are provided for each end face 7a of each leg 7. In particular as shown in FIG. 6, two detecting electrodes 21 for each leg 7 are disposed so as to be located outside across the extension line of the side face of each leg 7.

Other structures are the same as those of the first embodiment, the tuning fork 2 has surrounding frames 9, and the tuning fork 2, detecting electrodes 21, and frames 9 are formed from a single silicon substrate. As shown in FIG. 7, the frames 9 are placed between the top glass substrate 5 and the bottom glass substrate 6 and a gap having a thickness of approximately 10 μm is formed between the glass substrates 5 and 6 and the tuning fork 2, as the result the legs 7 of the tuning fork 2 are structured so as to be vibrated without restriction. The detecting electrodes 21 are fixed to the bottom glass substrate 6, and driving electrode 3 formed of aluminum film are formed on the bottom surface of the top glass substrate 5 so that one detecting electrode corresponds to each leg 7 of the tuning fork 2.

The gyroscope 20 of the present embodiment brings about the same effect as the first embodiment such as improved detection sensitivity, reduced driving voltage, and miniaturization of the device.

However, in the case of the present embodiment, two detecting electrodes 21 and one leg 7 constitute two capacitors, and the capacitance of one capacitor increases concomitantly with decreasing of the capacitance of the other capacitor when the legs 7 are vibrated in the horizontal direction. Therefore, the double capacitance change is obtained for the same vibration by detecting the capacitance difference between two capacitors, and the gyroscope 20 of the present embodiment is advantageous over the gyroscope 1 of the first embodiment in that the detection sensitivity is improved.

[Third Embodiment]

Figure 9:
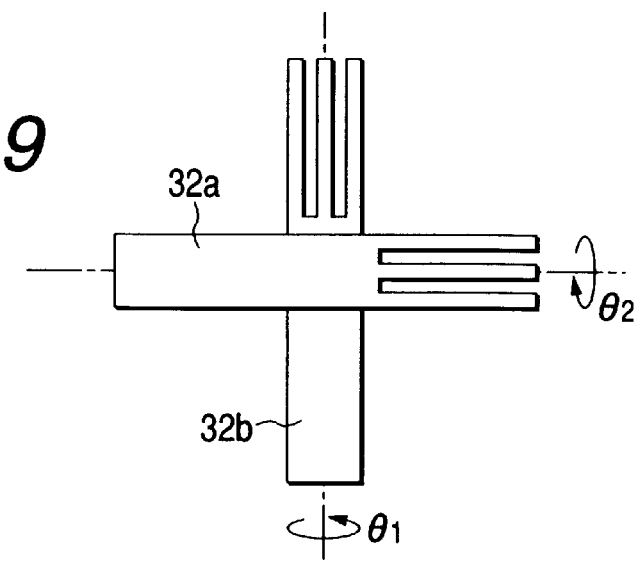
FIG. 9 is a plan view for illustrating the pen-type mouse of the third embodiment of the present invention.
Figure 10:
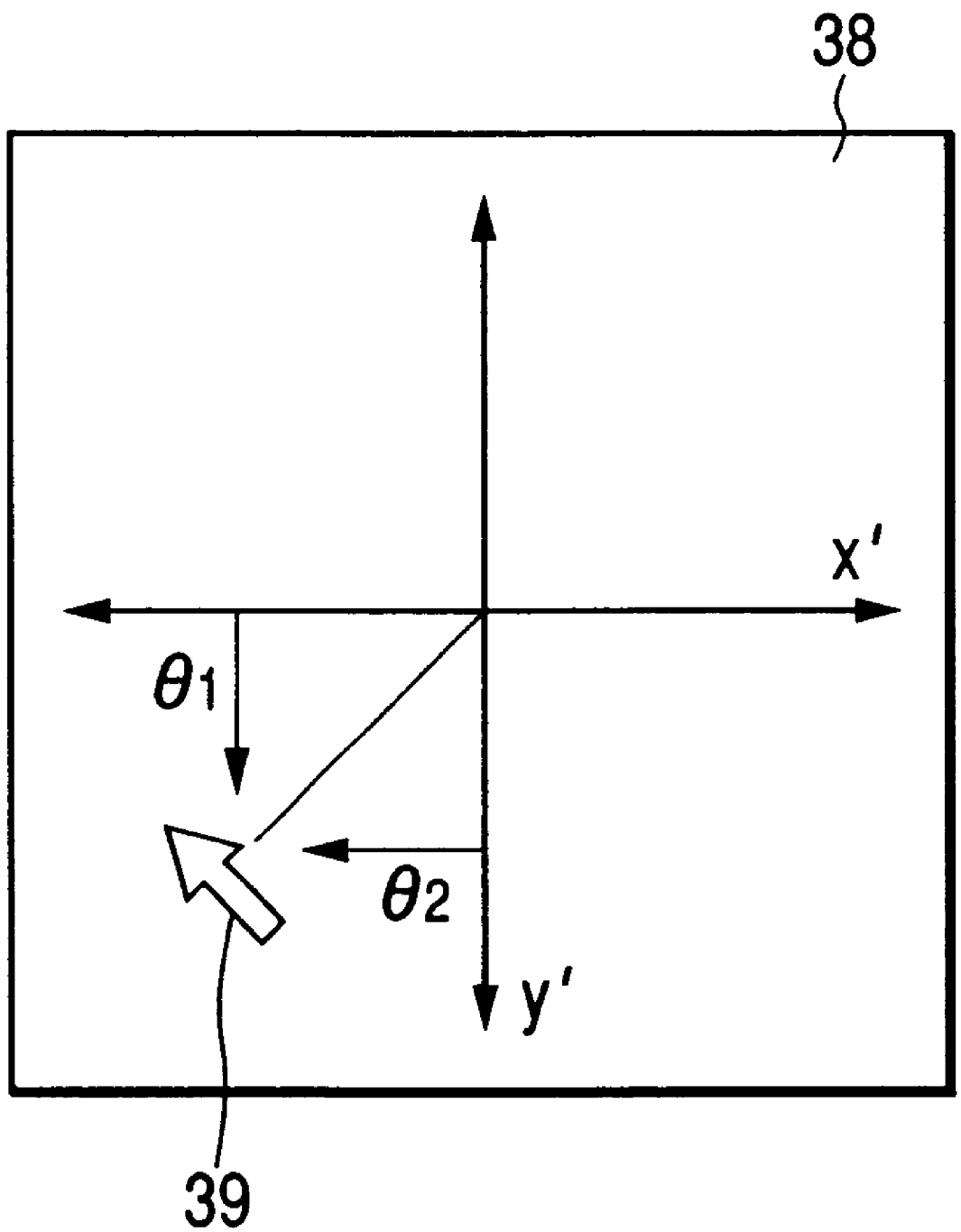
FIG. 10 is a front view for illustrating a personal computer screen on which the pen-type mouse of the third embodiment of the present invention is used.

The third embodiment of the present invention will be described in detail with reference to FIG. 8 to FIG. 10.

The present embodiment shows an example of an input apparatus in which gyroscopes of the first or second embodiment are used, and in detail it shows an example in which the present invention is applied to a coordinate input apparatus of a personal computer namely pen-type mouse.

Figure 8:
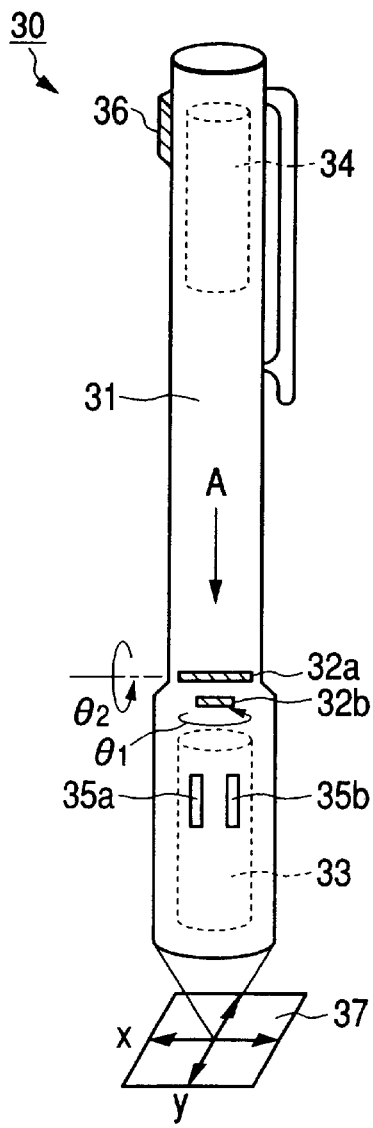
FIG. 8 is a perspective view for illustrating a pen-type mouse of the third embodiment of the present invention.

A pen-type mouse 30 of the present embodiment is provided with two gyroscopes 32a and 32b shown in the first or second embodiment in the internal of a pen-shaped case 31 as shown in FIG. 8. As shown in FIG. 9, two gyroscopes 32a and 32b are disposed so that the extension directions of the legs of the tuning forks of the gyroscopes 32a and 32b are orthogonal in the plan view of the pen-type mouse 30 (in the A-arrow direction in FIG. 8). A driving detecting circuit 33 for detecting the rotation angle is provided for driving the gyroscopes 32a and 32b and for detecting the rotation angle. In addition, a battery 34 is provided in the case 31, and two switches 35a and 35b that are equivalent to switches of a popular mouse and a switch 36 of the mouse body are provided.

A user holds the pen-type mouse 30 and moves the pen tip in the desired direction, and a cursor is thereby moved on a screen of a personal computer in the direction corresponding to the moving direction of the pen tip. In detail, when the pen tip is moved along the X-direction on the paper sheet 37 as shown in FIG. 8, the gyroscope 32b detects the rotation angle θ1, on the other hand when the pen tip is moved along the Y-direction on the paper sheet 37, the gyroscope 32a detects the rotation angle θ2. When the pen tip is moved in the direction other than those directions described herein above, the rotation angle θ1 and the rotation angle θ2 are combined. The personal computer side receives signals corresponding to the rotation angle θ1 and the rotation angle θ2 from the pen-type mouse 30, and moves the cursor 39 from the point on the screen 38 where the cursor 39 stayed before movement to the new point distant correspondingly to the magnitude of the rotation angle θ1 and the rotation angle θ2 that correspond to X' axis and Y' axis on the screen 38 as shown in FIG. 10. As described herein above, the pen-type mouse 30 realizes the same operation as obtained by use of a popular mouse that uses an optical encoder.

Because the gyroscopes 32a and 32b of the present invention used herein is advantageous in miniaturization, low driving voltage, and high sensitivity, the gyroscope of the present invention is preferably used for small coordinate input apparatus such as the pen-type mouse 30 of the present embodiment. Furthermore, the gyroscope of the present invention can be applied to general input apparatus for detecting the angular velocity.

The technical range of the present invention is by no means limited to the above-mentioned embodiments, but various modifications are applied within the scope of the present invention. For example, the gyroscopes described in the first and second embodiments have the structure that a silicon substrate that forms a tuning fork is placed between tow top and bottom glass substrates, but it is possible to vacuum-seal the space in which the tuning fork is contained in the case that anodic bonding is carried out in a vacuum chamber. This structure brings about high Q value the more, and the high efficiency device is realized.

The structure in which a silicon substrate for forming a tuning fork and detecting electrodes is not placed between two glass substrates, instead driving electrodes are provided on the bottom glass substrate and the top glass substrate is eliminated may be applied. In this case, the gyroscope has the simpler structure. Silicon is compatible with glass in view of bonding by means of anodic bonding, but a substrate formed of other material different from glass on the surface of which glass is fused may be used instead. Carbon may be used as the material of a tuning fork instead of silicon. Detailed descriptions of material and size of various component members are by no means limited to those described in above-mentioned embodiments, and various modifications may be applied.

[Fourth Embodiment]

The fourth embodiment of the present invention will be described hereinafter in detail with reference to FIG. 11 to FIGS. 15A to 15D.

Figure 11:
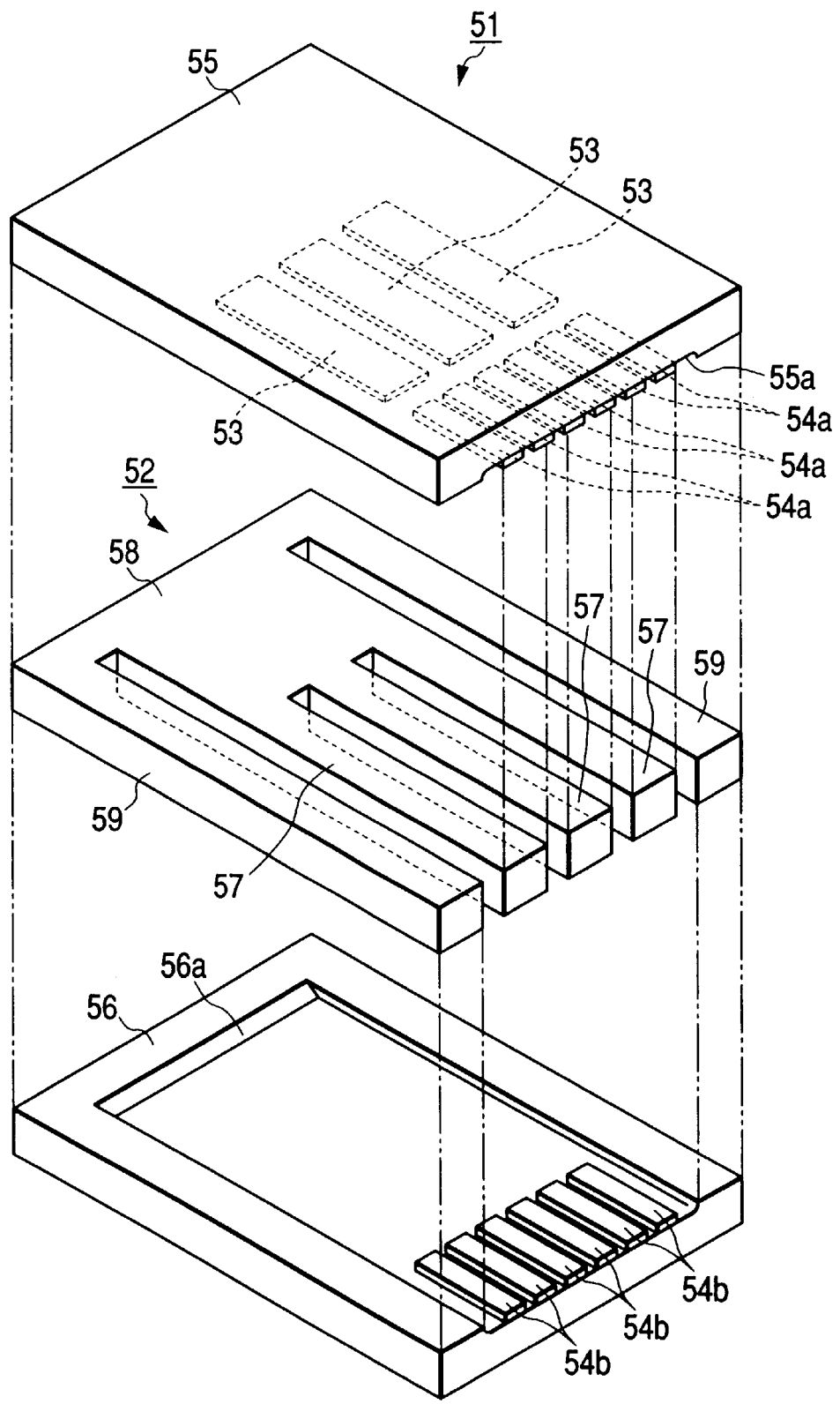
FIG. 11 is an exploded perspective view for illustrating a gyroscope of the fourth embodiment of the present invention.
Figure 12:
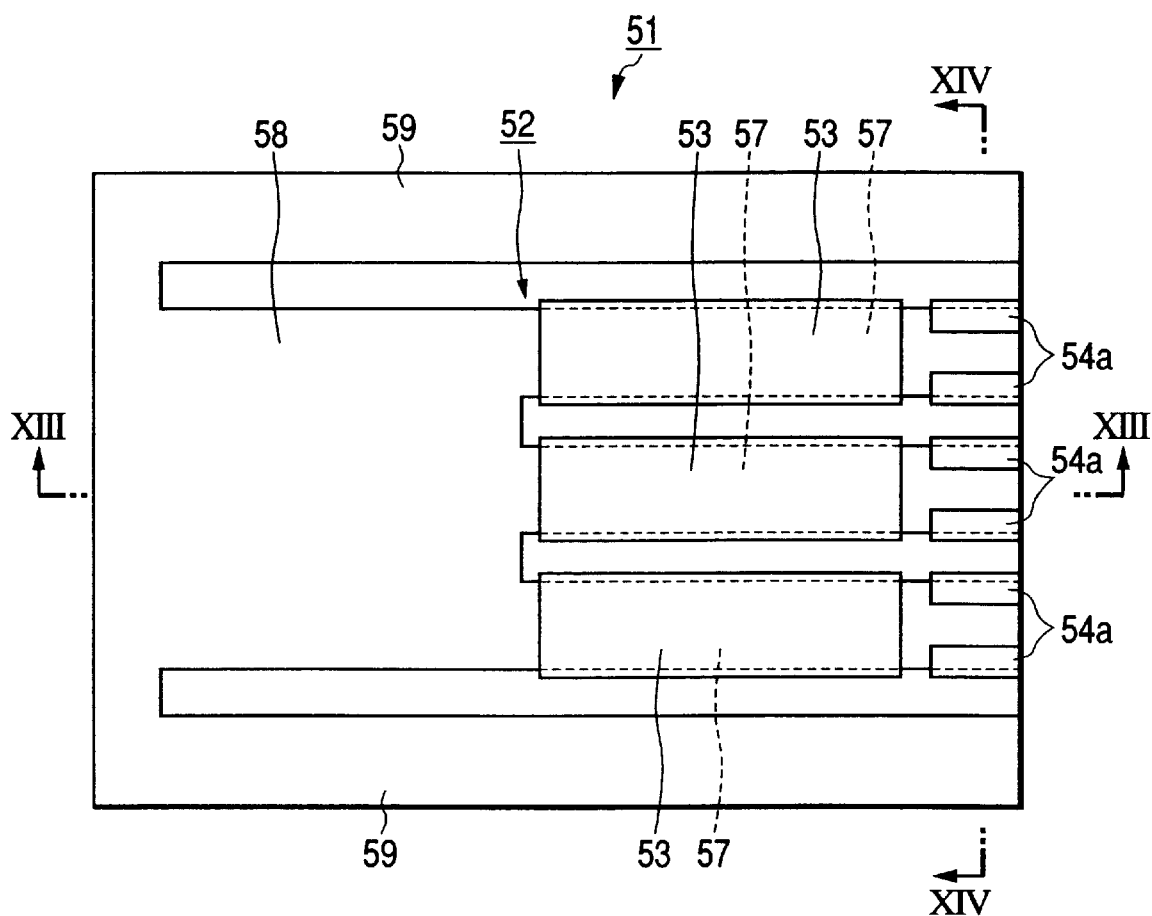
FIG. 12 is a plan view for illustrating the gyroscope of the fourth embodiment of the present invention.
Figure 13:
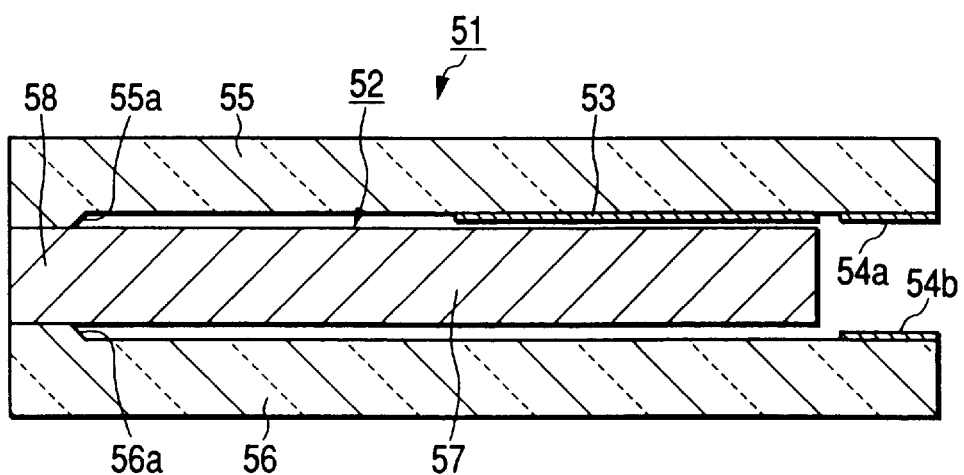
FIG. 13 is a side cross sectional view along the line xIII—xIII of FIG. 12.
Figure 14:
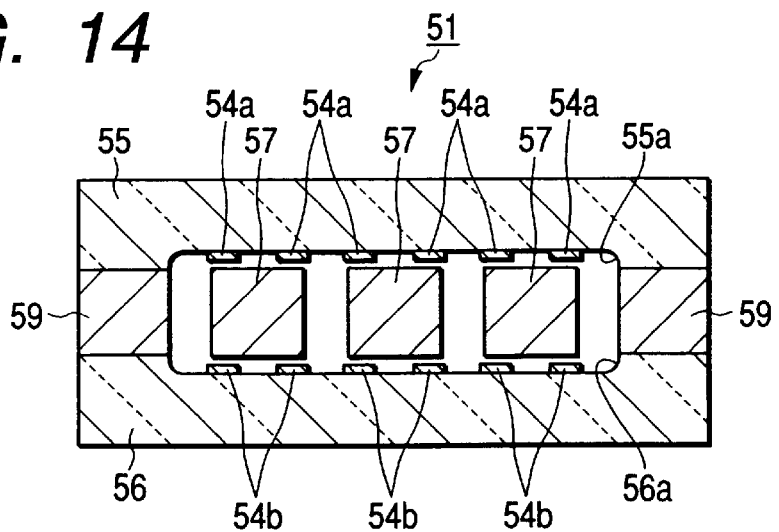
FIG. 14 is a side cross sectional view along the line xIV—xIV of FIG. 12.

FIG. 11 is a perspective view for illustrating the whole structure of a gyroscope 51 of the present embodiment, FIG. 12 is a plan view, FIG. 13 is a cross sectional view along the line xIII—xIII of FIG. 12, FIG. 14 is a cross sectional view along the line xIV—xIV of FIG. 12, and FIGS. 15A to 15D are process cross sectional views for describing a fabrication process of the gyroscope 51. In the drawings, character 52 denotes a tuning fork, 53 denotes detecting electrodes, 54a and 54b denote detecting electrodes, 55 denotes a top glass substrate, and 56 denotes a bottom glass substrate.

The gyroscope 51 of the present embodiment is provided with a tuning fork 52 having three legs 57 (vibrators) and a support 58 that connects base end sides of these legs 57 as shown in FIG. 11 and FIG. 12. The tuning fork 52 has surrounding frames 59, and the tuning fork 52 and frame 59 are formed from one silicon substrate having a thickness of approximately 200 μm. As shown in FIG. 13 and FIG. 14, the frame 59 is placed fixedly between the top glass substrate 55 and the bottom glass substrate 56, pits 55a and 56a having a depth of approximately 10 μm are formed on areas on the inside surface of two glass substrates 55 and 56 located above and under the tuning fork 52 respectively, gaps having a thickness of approximately 10 μm are formed between the glass substrates 55 and 56 and the tuning fork 52, and the legs 57 of the tuning fork 52 can vibrate without restriction.

As shown in FIG. 11 and FIG. 12, one driving electrode 53 is provided extendedly in the longitudinal direction of a leg 57 for each leg 57 at the position corresponding to the base end side of each leg 57 on the bottom surface of the top glass substrate 55. One pair of two detecting electrodes 54a are provided for each leg 57 at the position distant toward the head of the leg 57 from the position where the driving electrode 53 is formed on the bottom surface of the top glass substrate 55. Similarly, as shown in FIG. 14, one pair of two detecting electrodes 54b are provided for each leg 57 at the position distant toward the head of the leg 57 on the top surface of the bottom glass substrate 56. These driving electrodes 53 and detecting electrodes 54a and 54b are formed of aluminum or chromium having a film thickness of approximately 300 nm that are formed on the bottom surface of the top glass substrate 55 and the top surface of the bottom glass substrate 56. The driving electrodes 53 and detecting electrodes 54a and 54b have terminals (not shown in the drawing) served for applying or receiving a voltage.

Equal potential patterns formed of the same aluminum or chromium film as the driving electrodes 53 and detecting electrodes 54a and 54b are provided on the area of the inside surfaces of the top and bottom glass substrates 55 and 56 where the driving electrode 53 and detecting electrodes 54a and 54b are not provided though not shown in the drawing because the equal potential pattern is not necessary for performing the gyroscope function but necessary for fabrication of the gyroscope.

Next, an exemplary fabrication process of the gyroscope 51 having the above-mentioned structure is described.

Figure 15A:
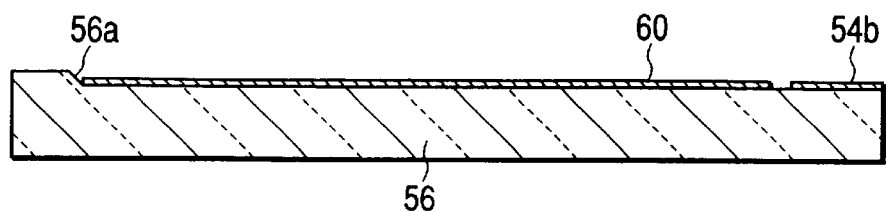
FIGS. 15A to 15D are process cross sectional views for describing the step-by-step fabrication processes for fabricating the gyroscope of the fourth embodiment of the present invention.

As shown in FIG. 15A, on a glass substrate 56, a chromium film is spattered on the surface, a resist pattern is formed, and the chromium film is etched with aid of the resist pattern as a mask. Next, the surface of the glass substrate 56 is subjected to hydrofluoric acid etching with aid of the resist pattern and chromium film as the mask to form a pit 56a having a depth of approximately 10 $\mu$m on the area corresponding to the tuning fork 52 on the glass substrate 56. Then, the resist pattern and chromium pattern are removed. Next, an aluminum film or chromium film having a thickness of approximately 300 nm is formed on the entire surface by spattering, and patterned by means of known photolithography technique to form a detecting electrode 54b an equal potential pattern 60, and the processed glass substrate is used as the bottom glass substrate 56. A top glass substrate 55 is fabricated in the same manner as used herein above. In the case of a top glass substrate 55, an equal potential pattern 60, a detecting electrode 54a, and driving electrodes 53 are formed simultaneously by forming an aluminum film or chromium film having a film thickness of approximately 300 nm.

Figure 15B:
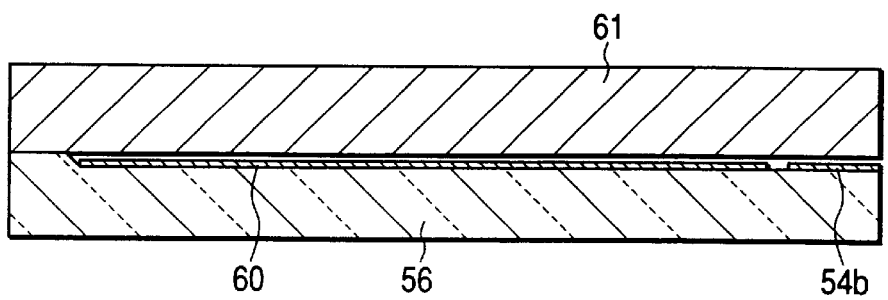

As shown in FIG. 15B, the bottom side of a silicon substrate 61 is bonded to the bottom glass substrate by means of anodic bonding. At that time, the area to be the support 58 and the area to be the frame 59 of the silicon substrate 61 are bonded. In anodic bonding process, a positive voltage is applied to the silicon substrate 61 and a negative voltage is applied to the bottom glass substrate 56 to bond the silicon and glass together. The silicon substrate can be bent and brought into touch to the glass substrate 56 due to electrostatic force caused during anodic bonding process because the gap between the silicon substrate 61 surface and the glass substrate 56 surface is only approximately 10 $\mu$m on the area where the tuning fork 52 is to be formed. If both surfaces are brought into touch each other, the touched area is bonded, and the tuning fork cannot be fabricated. If the potential of the glass substrate 56 and the silicon substrate 61 is equalized, such undesirable bonding of the area of the silicon substrate 61, that is not to be bonded to the glass substrate 56, is prevented. The equal potential pattern 60 is used on the glass substrate 56 surface on that reason.

Figure 15C:
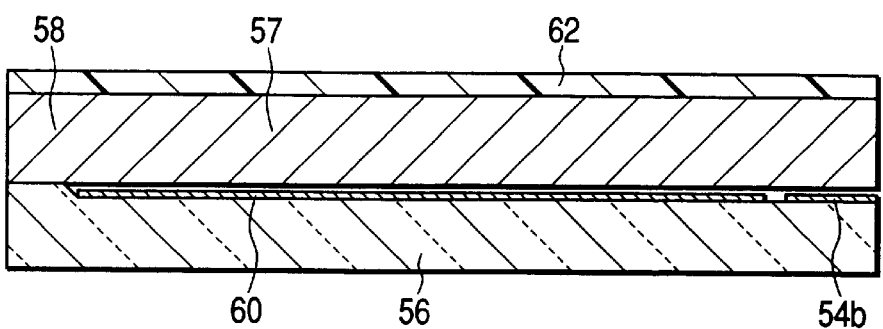

Next, as shown in FIG. 15C, a resist pattern 62 is formed on the silicon substrate 61 surface. At that time, the plane resist pattern 62 is shaped so as not to remove silicon on the portion corresponding to the tuning fork 52 and the frame 59 as shown in FIG. 12. The silicon substrate 61 is subjected to etching though the thickness of the silicon substrate 61 by means of anisotropic etching such as reactive ion etching with aid of the resist pattern 62 as a mask. Thereby, the tuning fork 52 and the frame 59 are formed, and the tuning fork 52 remain untouched above the bottom glass substrate 56. Thereafter, the resist pattern 62 is removed.

Figure 15D:
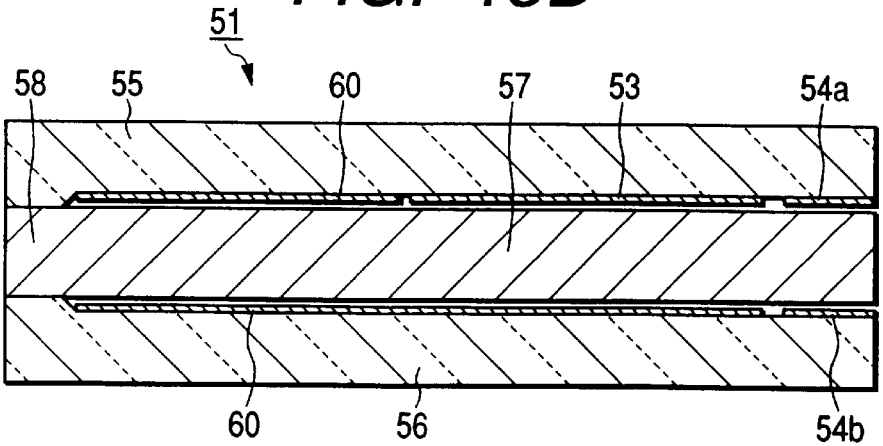

Next, as shown in FIG. 15D, the top side of the silicon substrate 61 is bonded to the top glass substrate 55 by means of anodic bonding. At that time, the frame 59 and support 58 of the silicon substrate 61 are bonded to the top glass substrate 55. Through the above-mentioned processes, the gyroscope 51 of the present embodiment is completed.

When the gyroscope 51 of the present embodiment is used, an oscillator is connected to the driving electrodes 53, a capacitance detector is connected to the detecting electrodes 54a and 54b, and the tuning fork 52 is grounded. When a voltage having a frequency of several kHz is applied to the driving electrodes 53 by driving the oscillator, the legs 57 of the tuning fork 52 are vibrated in the vertical direction. In this state, when the angular velocity having the rotation axis in the longitudinal direction of the leg 57 is supplied, the horizontal vibration is caused corresponding to the magnitude of the supplied angular velocity. At that time, the top face and the bottom face of each leg 57 of the tuning fork 52 are faced to the detecting electrodes 54a and 54b, the facing area where the top face and the bottom face of each leg 57 faces to each detecting electrode 54a and 54b changes concomitantly with vibration of the leg 57, and the facing area change causes the capacitance change. The angular velocity can be detected by detecting the capacitance change by means of a capacitance detector.

It is not required to provide a detecting electrode between a leg and an adjacent leg in the gyroscope 51 of the present embodiment unlike the conventional gyroscope. As the result, the inter-leg gap can be minimized to the work limit, for example, approximately 10 $\mu$m, and Q value can be increased. For example, in a gyroscope having an inter-leg gap of 200 $\mu$m, though Q value is approximately 1000 for the inter-leg gap of 300 $\mu$m to 400 $\mu$m, Q value is doubled to approximately 2000 for narrower inter-leg gap of several tens $\mu$m. The increased Q value brings about the improved detection sensitivity and the reduced driving voltage when the device is used as an angular sensor. Furthermore, the device can be miniaturized. The device has the structure that can be vacuum-sealed, and Q value is improved the more.

In particular in the case of the present embodiment, two detecting electrodes 54a and 54b are provided corresponding to each leg 57 of the tuning fork 52, and two capacitors are formed for each leg 57. When each leg 57 is vibrated in the horizontal direction, the capacitance of one capacitor out of two capacitors increases and the capacitance of the other capacitor decreases by the same magnitude corresponding to the increment concomitantly. Therefore, the detection of the difference between two capacitance changes gives the doubled capacitance change for the same vibration, and the detection sensitivity is improved the more. Furthermore, because the detecting electrodes 54a and 54b are provided on the end side of the leg 57, the capacitance change is detected at the position where the maximum vibration displacement is obtained and the maximum sensitivity is obtained.

Because the tuning fork 52 is placed between two glass substrates 55 and 56 in the gyroscope 51 of the present embodiment, the tuning fork 52 is protected by the glass substrates 55 and 56, and the gyroscope is easy to be handled. Because dust is difficult to enter into the tuning fork 52 structure, disturbance is suppressed, and the sensor accuracy is improved. The gyroscope 51 has the structure that is acceptable of vacuum sealing, and the vacuum seal brings about high Q value the more.

[Fifth Embodiment]

Figure 17:
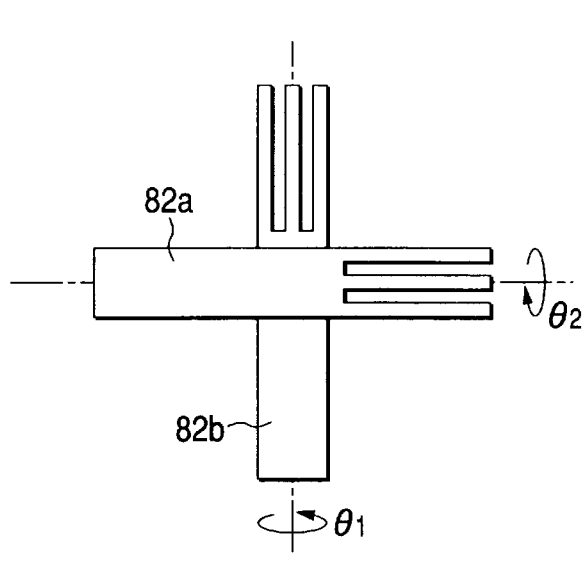
FIG. 17 is a plan view for illustrating the layout of two gyroscope used in the pen-type mouse of the fifth embodiment of the present invention.
Figure 18:
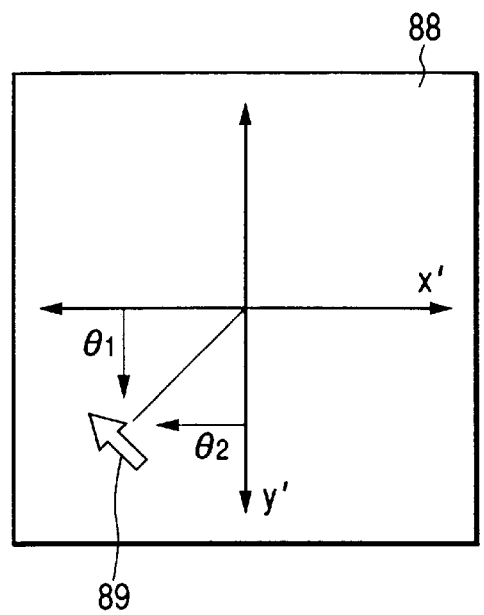
FIG. 18 is a front view for illustrating a personal computer screen on which the pen-type mouse of the fifth embodiment of the present invention is used.
Figure 19:
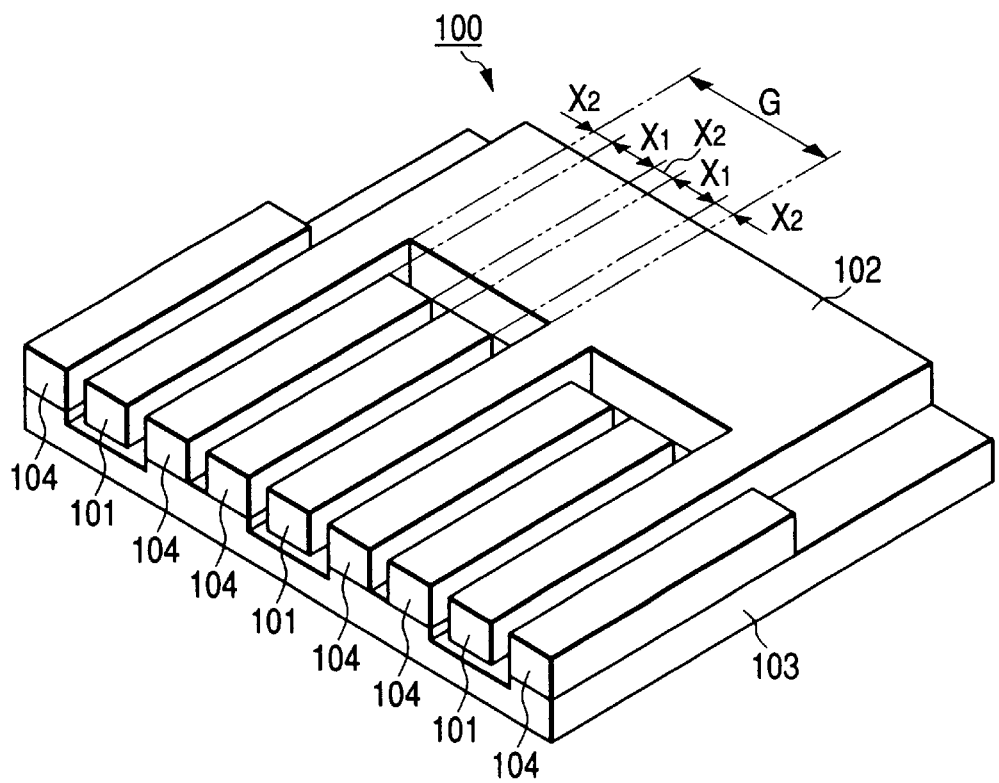
FIG. 19 is a perspective view for illustrating an example of the conventional gyroscope.

The fifth embodiment of the present invention will be described in detail with reference to FIG. 16 to FIG. 18.

The present embodiment shows an example of an input apparatus in which gyroscopes of the first or fifth embodiment are used, and in detail it shows an example in which the present invention is applied to a coordinate input apparatus of a personal computer namely pen-type mouse.

Figure 16:
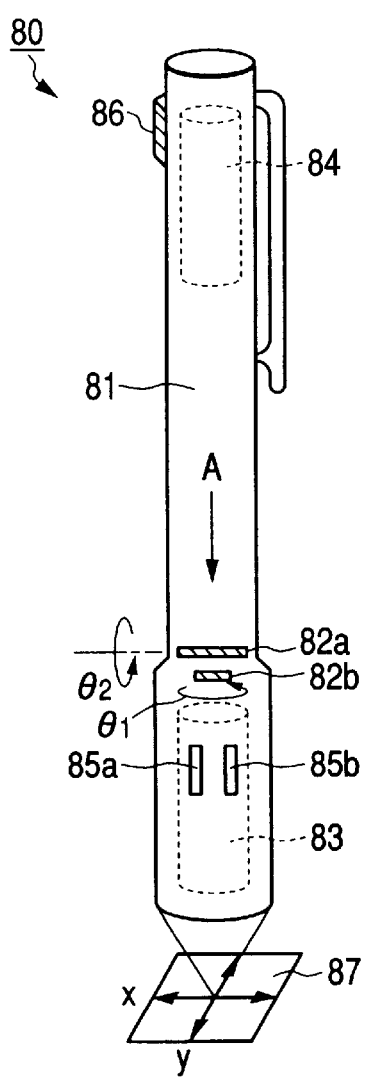
FIG. 16 is a perspective view for illustrating a pen-type mouse of the fifth embodiment of the present invention.

A pen-type mouse 80 of the present embodiment is provided with two gyroscopes 82*a* and 82*b* shown in the fourth embodiment in the internal of a pen-shaped case 81 as shown in FIG. 16. As shown in FIG. 17, two gyroscopes 82*a* and 82*b* are disposed so that the extension directions of the legs of the tuning forks of the gyroscopes 82*a* and 82*b* are orthogonal in the plan view of the pen-type mouse 80 (in the A-arrow direction in FIG. 16). A driving detecting circuit 83 for detecting the rotation angle is provided for driving the gyroscopes 82*a* and 82*b* and for detecting the rotation angle. In addition, a battery 84 is provided in the case 81, and two switches 85*a* and 85*b* that are equivalent to switches of a popular mouse and a switch 86 of the mouse body are provided.

A user holds the pen-type mouse 80 and moves the pen tip in the desired direction, and a cursor is thereby moved on a screen of a personal computer in the direction corresponding to the moving direction of the pen tip. In detail, when the pen tip is moved along the X-direction on the paper sheet 87 shown in FIG. 16, the gyroscope 82*b* detects the rotation angle θ1 on the other hand when the pen tip is moved along the Y-direction on the paper sheet 87, the gyroscope 82*a* detects the rotation angle θ2. When the pen tip is moved in the direction other than those directions described herein above, the rotation angle θ1 and the rotation angle θ2 are combined. The personal computer side receives signals corresponding to the rotation angle θ1 and the rotation angle θ2 from the pentype mouse 80, and moves the cursor 89 from the point on the screen 88 where the cursor 89 stayed before movement to the new point distant correspondingly to the magnitude of the rotation angle θ1 and the rotation angle θ2 that correspond to X' axis and Y' axis on the screen 88 as shown in FIG. 18. As described herein above, the pen-type mouse 80 realizes the same operation as obtained by use of a popular mouse that uses an optical encoder.

Because the gyroscopes 82*a* and 82*b* of the present invention used herein is advantageous in miniaturization, low driving voltage, and high sensitivity, the gyroscope of the present invention is preferably used for small coordinate input apparatus such as the pen-type mouse 80 of the present embodiment. Furthermore, the gyroscope of the present invention can be applied to general input apparatus for detecting the angular velocity.

The technical range of the present invention is by no means limited to the above-mentioned embodiments, but various modifications are applied within the scope of the present invention. For example, in the gyroscope described in the fourth embodiment, the example in which driving electrodes are provided on the top glass substrate is described, otherwise the driving electrodes may be provided on the bottom glass substrate. The driving electrodes may be provided on both glass substrates differently from the case in which driving electrodes are provided on any one of the top and bottom glass substrates. On the other hand, in the gyroscope described in the fourth embodiment, total four detecting electrodes, namely two above the top face and two under the bottom face of each leg, are provided, otherwise at least one detecting electrode may be provided. In this case, the detecting electrode may be provided above the top face or under the bottom face of each leg, otherwise the place above the top face and the place under the bottom face may be mixed for, for example, three legs.

The structure in which a tuning fork is not placed between two glass substrates, namely the structure having no top glass substrate, may be applied. In this case, the gyroscope has the simpler structure. Silicon is compatible with glass in view of bonding by means of anodic bonding, but a substrate formed of other material different from glass on the surface of which glass is fused may be used instead. Carbon may be used as the material of a tuning fork instead of silicon. Detailed descriptions of material and size of various component members are by no means limited to those described in above-mentioned embodiments, and various modifications may be applied.

As described herein above in detail, the gyroscope of the present invention does not require to be provided with a detection electrode between a leg and an adjacent leg of a tuning fork unlike the conventional tuning fork, larger Q value is obtained, the detection sensitivity is improved, the driving voltage is reduced, and the device is miniaturized. By applying the gyroscope, a small apparatus such as a coordinate input apparatus for a personal computer is realized.

What is claimed is:

1. A gyroscope comprising:

a tuning fork formed of conductive material having a plurality of vibrators and a support to connect base ends of the plurality of vibrators, the plurality of vibrators disposed in parallel with and in extremely close proximity with each other;

a plurality of driving electrodes to drive the plurality of vibrators, each driving electrode to drive an associated vibrator in capacitance coupling with the associated vibrator and extending in parallel with the associated vibrator; and at least one detecting electrode for each of the plurality of vibrators, each detecting electrode disposed correspondingly to the corresponding vibrator to face an end face of the corresponding vibrator in an extending direction to detect the capacitance formed between the detecting electrode and the end face, wherein the driving electrodes are formed extendedly in the extending direction of the plurality of vibrators and disposed at a position on at least one side face of the tuning fork corresponding to the associated vibrator.

2. The gyroscope according to claim 1, wherein an inter-leg gap between adjacent vibrators of the plurality of vibrators is at most several tens of microns.

3. The gyroscope according to claim 1, wherein the conductive material is silicon.

4. An input apparatus comprising at least one gyroscope according to claim 1.

5. The input apparatus according to claim 4, wherein an inter-leg gap between adjacent vibrators of the plurality of vibrators is at most several tens of microns.

6. The input apparatus according to claim 4, wherein the conductive material is silicon.

7. A gyroscope comprising:

a tuning fork formed of conductive material and having a plurality of vibrators and a support to connect base end sides of the plurality of vibrators, the plurality of vibrators disposed in parallel with and in extremely close proximity with each other;

a plurality of driving electrodes to drive the plurality of vibrators, each driving electrode to drive an associated vibrator in capacitance coupling with the associated vibrator and extending in parallel with the associated vibrator; and at least one detecting electrode for each of the plurality of vibrators provided above one side face of the tuning fork, the at least one detecting electrode for a corresponding vibrator to face an end of the corresponding vibrator and detect a capacitance formed between the at least one detecting electrode and the corresponding facing vibrator, wherein each driving electrode is formed extendedly in an extending direction of the associated vibrator, provided at a position above one side face of the tuning fork corresponding to the associated vibrator, and the driving electrodes are provided apart from the detecting electrodes.

8. The gyroscope according to claim 7, wherein an inter-leg gap between adjacent vibrators of the plurality of vibrators is at most several tens of microns.

9. The gyroscope according to claim 7, wherein the conductive material is silicon.

10. The gyroscope according to claim 7, wherein the at least one detecting electrode for each of the plurality of vibrators comprises a pair of electrodes that face the corresponding vibrator, and each electrode of each pair of electrodes separately detects a capacitance formed between the corresponding electrode and the end of the corresponding vibrator.

11. An input apparatus comprising the gyroscope according to claim 7.

12. The input apparatus according to claim 11, wherein an inter-leg gap between adjacent vibrators of the plurality of vibrators is at most several tens of microns.

13. The input apparatus according to claim 11, wherein the conductive material is silicon.

14. The input apparatus according to claim 11, wherein the at least one detecting electrode for each of the plurality of vibrators comprises a pair of electrodes that face the corresponding vibrator, and each electrode of each pair of electrodes separately detects a capacitance formed between the corresponding electrode and the end of the corresponding vibrator.

15. A gyroscope comprising:

a tuning fork formed of conductive material and having a plurality of vibrators and a support to connect base end sides of the plurality of vibrators, the plurality of vibrators disposed in parallel with and in extremely close proximity with each other;

a plurality of driving electrodes to drive the plurality of vibrators, each driving electrode to drive an associated vibrator in capacitance coupling with the associated vibrator and extending in parallel with the associated vibrator; and at least one detecting electrode for each of the plurality of vibrators provided under one side face of the tuning fork, the at least one detecting electrode for a corresponding vibrator to face an end of the corresponding vibrator and detect a capacitance formed between the at least one detecting electrode and the corresponding facing vibrator, wherein each driving electrode is formed extendedly in an extending direction of the associated vibrator, provided at a position above one side face of the tuning fork corresponding to the associated vibrator, and the driving electrodes are provided apart from the detecting electrodes.

16. The gyroscope according to claim 15, wherein an inter-leg gap between adjacent vibrators of the plurality of vibrators is at most several tens of microns.

17. The gyroscope according to claim 15, wherein the conductive material is silicon.

18. The gyroscope according to claim 15, wherein the at least one detecting electrode for each of the plurality of vibrators comprises a pair of electrodes that face the corresponding vibrator, and each electrode of each pair of electrodes separately detects a capacitance formed between the corresponding electrode and the end of the corresponding vibrator.

19. An input apparatus comprising the gyroscope according to claim 15.

20. The input apparatus according to claim 19, wherein the at least one detecting electrode for each of the plurality of vibrators comprises a pair of electrodes that face the corresponding vibrator, and each electrode of each pair of electrodes separately detects a capacitance formed between the corresponding electrode and the end of the corresponding vibrator.

21. The input apparatus according to claim 19, wherein an inter-leg gap between adjacent vibrators of the plurality of vibrators is at most several tens of microns.

22. The input apparatus according to claim 19, wherein the conductive material is silicon.

* * * * *